(12) United States Patent
Lin

(10) Patent No.: US 6,876,314 B1
(45) Date of Patent: Apr. 5, 2005

(54) SELF-GENERATING AUTOMATIC CODE GENERATOR

(75) Inventor: Nelson H. Lin, Richmond (CA)

(73) Assignee: robocoder corporation, Vancouver (CA)

(*) Notice: Subject to any disclaimer, the term of this patent is extended or adjusted under 35 U.S.C. 154(b) by 0 days.

(21) Appl. No.: 10/781,229

(22) Filed: Feb. 18, 2004

(51) Int. Cl.⁷ .............................................. H03M 7/00
(52) U.S. Cl. ...................................... 341/50; 717/117
(58) Field of Search ..................... 341/50, 51; 717/117; 715/514

(56) References Cited

U.S. PATENT DOCUMENTS

| | | | |
|---|---|---|---|
| 4,796,179 A | 1/1989 | Lehman et al. ............... 700/86 |
| 5,159,687 A | 10/1992 | Richburg ..................... 717/106 |
| 5,187,788 A | 2/1993 | Marmelstein ................ 717/109 |
| 5,280,617 A | 1/1994 | Brender et al. ............. 717/159 |
| 5,295,222 A | 3/1994 | Wadhwa et al. ................ 395/1 |
| 5,499,371 A | 3/1996 | Henninger et al. ......... 717/108 |
| 5,555,367 A | 9/1996 | Premerlani et al. ............ 707/4 |
| 5,590,331 A | 12/1996 | Lewis et al. ................. 717/144 |
| 5,612,866 A | 3/1997 | Savanyo et al. .............. 700/86 |
| 5,699,310 A * | 12/1997 | Garloff et al. .............. 717/108 |
| 5,875,333 A | 2/1999 | Fish et al. ................... 717/109 |
| 5,978,581 A | 11/1999 | Sadiq et al. ................. 717/104 |
| 6,011,917 A | 1/2000 | Leymann et al. ........... 395/702 |
| 6,113,649 A | 9/2000 | Govindaraj ..................... 717/2 |
| 6,188,999 B1 | 2/2001 | Moody ......................... 706/61 |
| 6,199,195 B1 | 3/2001 | Goodwin et al. ........... 717/104 |
| 6,219,831 B1 | 4/2001 | Ono ............................. 717/136 |
| 6,246,404 B1 | 6/2001 | Feigner et al. .............. 345/708 |
| 6,257,774 B1 * | 7/2001 | Stack ........................... 717/110 |
| 6,346,945 B1 | 2/2002 | Mansurov et al. .......... 345/473 |
| 6,370,681 B1 | 4/2002 | Dellarocas et al. ......... 717/110 |
| 6,408,431 B1 | 6/2002 | Heughebaert et al. ...... 717/106 |
| 6,487,713 B1 | 11/2002 | Cohen et al. ................ 717/105 |
| 6,631,519 B1 | 10/2003 | Nicholson et al. .......... 717/169 |
| 6,651,240 B1 | 11/2003 | Yamamoto et al. ......... 717/108 |
| 2001/0037496 A1 | 11/2001 | Simonyi ...................... 717/146 |
| 2002/0010908 A1 | 1/2002 | Cheng et al. ................ 717/106 |
| 2002/0026632 A1 | 2/2002 | Fuchs et al. ................. 717/137 |
| 2002/0099530 A1 | 7/2002 | Foltinek ........................ 703/22 |
| 2002/0199168 A1 | 12/2002 | Namito ........................ 717/107 |
| 2003/0026143 A1 | 2/2003 | Brennan ...................... 365/200 |
| 2003/0046061 A1 | 3/2003 | Preston et al. .................. 704/9 |
| 2003/0084423 A1 | 5/2003 | Clegg et al. ................. 717/105 |
| 2003/0149958 A1 | 8/2003 | Baluja et al. ................ 717/105 |
| 2003/0167444 A1 | 9/2003 | Zorc ............................. 715/513 |
| 2003/0167455 A1 | 9/2003 | Iborra et al. ................. 717/105 |

FOREIGN PATENT DOCUMENTS

WO   WO 01/13303 A1   2/2001   ........... G06F/17/60

OTHER PUBLICATIONS

"GeneXus Overview," ARTech, www.genexus.com, Sep., 2003, pp. 1–17.

* cited by examiner

Primary Examiner—Peguy JeanPierre
Assistant Examiner—Joseph Lauture
(74) Attorney, Agent, or Firm—Kory D. Christensen; Stoel Rives LLP

(57) ABSTRACT

A self-generating automatic code generation system includes a user interface for capturing a set of knowledge and rules that define an application; a first automatic code generator for generating code for the application using the set of knowledge and rules; a user-interface for capturing a set of knowledge and rules that define a new feature to be added to the application; and a second automatic code generator supporting the new feature that was automatically generated by the first automatic code generator using the set of knowledge and rules defining the new feature as well as a set of knowledge and rules defining the first automatic code generator, wherein the second automatic code generator is to regenerate the code for the application such that the application includes the new feature using a set of knowledge and rules for generating the application as well as a set of knowledge and rules for using the new feature.

32 Claims, 18 Drawing Sheets

FIG. 5

Please select the member, then add/edit the appropriate salary information, click the Update Button to mc valid-from must be one day after. The last valid-to must be year 9999.

| Salary Info | | | | | | | | | | | Update | |
|---|---|---|---|---|---|---|---|---|---|---|---|---|

⊙ Active Employee ◄— 902
○ Inactive Employee

| rs | Exemptions | Exempt | Exempt | Insured | IDM Prov | Taxable Benefit | Bonus | Annual Salary | Gross Pay | EHT | EI |
|---|---|---|---|---|---|---|---|---|---|---|---|
| 80 | 4 | N | N | 7,756.00 | 8,307.00 | | 0.00 | 0.00 | 214,440.00 | 9,934.61 | 145.64 | 64 |
| 80 | 4 | N | N | 7,756.00 | 8,307.00 | | 0.00 | 0.00 | 223,375.00 | 8,704.61 | 0.00819 |

Main Info
Member ID 7

FIG. 9

Please select the member, then add/edit the appropriate salary information, click the Update Button to mc valid-from must be one day after. The last valid-to must be year 9999.

Salary Info   [Update]

○ Active Employee
◉ Inactive Employee ← 1002

John Doe 6    Main Info
              Member ID 1

1 of 1

| Pay Period Hrs | Vacation | Exempt | OOP Exempt | TD1 Fed | TD1 Prov | Taxable Benefit | Bonus | Annual Salary | Gross Pay | CPP | EI |
|---|---|---|---|---|---|---|---|---|---|---|---|
| 80 | 4 | N | N | 7,634.00 | 8,168.00 | 0.00 | 0.00 | 55,754.40 | 1,476.00 | 50.07 | 26 |
| 80 | 4 | N | N | 7,634.00 | 8,168.00 | 0.00 | 0.00 | 78,628.00 | 2,081.54 | 73.21 | 37 |
| 80 | 4 | N | N | 7,756.00 | 8,307.00 | 0.00 | 0.00 | 78,628.00 | 2,081.54 | 77.11 | 35 |
| 80 | 4 | N | N | 7,756.00 | 8,307.00 | 0.00 | 0.00 | 17,220.00 | 1,838.46 | 107.57 | 48 |
| 80 | 4 | Y | N | 7,756.00 | 8,307.00 | 600.00 | 0.00 | 39,220.00 | 9,938.46 | 0.00 | 0 |

FIG. 10

Please select the appropriate screen, edit the columns characteristic or create new columns, click the Upd Screen Columns Maintenance — Update Main Info
Screen ID 59

AdmScreenFilter 1 of 1

| Screen Column ID | Master Table | Column ID | Column Name | Default Value | System Value | Launch Screen | Column Size | Column Height | Display Mode | Drop Down Key Color |
|---|---|---|---|---|---|---|---|---|---|---|
| 840 | Y | ScreenFilter-ScreenFilterId | ScreenFilterId | | | | 100 | | TextBox | |
| 841 | Y | ScreenFilter-ScreenId | ScreenId | | | | | | DropDownList | Screen-ScreenId |
| 842 | Y | ScreenFilter-ScreenFilterName | ScreenFilterName | | | | 250 | | TextBox | |
| 844 | Y | ScreenFilter-FilterClause | FilterClause | | | | 400 | 66 | MultiLine | |
| 845 | Y | ScreenFilter-FilterOrder | FilterOrder | | | | 50 | | TextBox | |
| 846 | N | ScreenFilterHlp-ScreenFilterHlpId | ScreenFilterHlpId | | | | | | TextBox | |
| 848 | N | ScreenFilterHlp-CultureId | CultureId | | | | | | DropDownList | CtCultureT-CultureId |
| 849 | N | ScreenFilterHlp-FilterName | FilterName | | | | | | TextBox | |

,
sb.Append(GetCnDclr(dw["SysProgram"].ToString()) + ", SqlInt32 screenFilterId)" + (char)13);
sb.Append("       (" + (char)13);
sb.Append("          if ( da == null )" + (char)13);
sb.Append("          (" + (char)13);
sb.Append("              throw new System.ObjectDisposedException( GetType().FullName );" + (char
sb.Append("          )" + (char)13);
sb.Append("          SqlCommand selCmd = new SqlCommand(\"GetLis" + dw["ProgramName"].ToString()
sb.Append("          selCmd.CommandType = CommandType.StoredProcedure;" + (char)13);
parameterNames.Remove(0,parameterNames.Length);
parameterNames.Append(dtLis.Rows[0]["ParameterlNames"].ToString());
param = "";
while (parameterNames.Length > 0)
{
    param = (new Utils()).PopFirstWord(parameterNames, (char)44);
    sb.Append("          selCmd.Parameters.Add(\"@" + param + "\", " + param + ");" + (char)13);
}
sb.Append("          selCmd.Parameters.Add(\"@screenFilterId\", screenFilterId);" + (char)13);
sb.Append("          da.SelectCommand = selCmd;" + (char)13);
sb.Append("          DataTable dt = new DataTable();" + (char)13);
sb.Append("          da.Fill(dt);" + (char)13);
sb.Append("          return dt;" + (char)13);
sb.Append("      )" + (char)13);
```

Please select the appropriate screen filter radio-button, edit the contents, click the Update Button to make changes permanent c permitted.

Screen Filters Maintenance | Update | Delete

◉ Administration Screens
○ Other Screens

<Add a new AdmScreenFilter>
AdmScreenFilter - Administration Screens
AdmScreenFilter - Other Screens Main Info Filter ID: 8
Screen: AdmScreenFilter
Filter Name: Other Screens
Filter Clause: EXISTS (SELECT 'true' FROM dbo.Screen a01 INNER JOIN dbo.Systems a02 ON a01.SystemId = a02.SystemId WHERE a00.ScreenId = a01.ScreenId AND a02.SysProgram <> 'Y')
Filter Order: 2

1 of 1

| Culture | FilterHeader | | |
|---------|--------------|------|--------|
| en-US | Other Screens | Edit | Delete |
| | | Edit | Delete |

SELF-GENERATING AUTOMATIC CODE GENERATOR

TECHNICAL FIELD

The present invention relates generally to the field of software development and, more particularly, to improvements in automatic code generation for enterprise software.

BACKGROUND OF THE INVENTION

Reducing development and maintenance time is an increasingly important goal for developers of enterprise software. Automatic code generation is one approach to achieving this goal. Enterprise software applications are usually comprised of millions of lines of computer code and have traditionally required teams of programmers several years to create, test and debug. Today, an automatic code generator may be used to capture knowledge and business rules for an enterprise software application and generate the millions of lines of codes within seconds in any desired computer language and for any platform. An example of an automatic code generator includes GeneXus, a product of ARTech Consultores S.R.L.

Ironically, automatic code generators, which are themselves enterprise-level software applications, are developed from scratch using standard development tools and programming techniques, not using automatic code generation. This means that all the benefits attributable to automatic code generators do not apply to the development process of automatic code generators.

Another deficiency of conventional automatic code generators is the discontinuity that inevitably results between development and maintenance of enterprise software. Traditionally, an automatic code generator produces computer code for a target platform based on the captured knowledge and business rules. Once the computer code is generated, programmers customize the code to fix bugs, add new features, and the like. This breaks the continuity between the enterprise software and the automatic code generator. Subsequent development or maintenance on the enterprise software must be done the traditional way without the benefit of the automatic code generator.

The discontinuity problem is exacerbated where an automatic code generator is used to create several different software applications for an enterprise, all of which are subsequently modified or updated in various ways outside of the context of the automatic code generator. If a new feature is later desired for all of the software applications, programmers must independently code the new feature into each application, thereby increasing development time and the possibility of bugs and incompatibility between applications.

What is needed is a way to bring all the benefits provided by an automatic code generator to the automatic code generator, itself, so that any enterprise software applications generated thereby can always rely on the automatic code generator to regenerate any computer code that these applications require. Furthermore, what is needed is a way for programmers to add a new feature only once and have the code generator automatically supply that feature to all of the other applications.

BRIEF DESCRIPTION OF THE DRAWINGS

Non-exhaustive embodiments of the invention are now described with reference to the figures, in which

FIG. 5 illustrates some of the static knowledge and rules required for the generation of computer code for a plurality of applications;

FIG. 9 is an example screen of an application generated with the new feature "Screen Filters" with the default filter radio button checked;

FIG. 10 is an example screen of an application generated with the new feature "Screen Filters" with the other filter radio button checked;

FIG. 12 illustrates dynamic knowledge captured for the generation of the screen required to capture dynamic knowledge required for the new feature "Screen Filters";

FIG. 14 illustrates the screen to capture dynamic knowledge required for the new feature "Screen Filters";

FIG. 15 shows some of the code representing static knowledge and static rules for the generation of computer code needed for the new feature "Screen Filters";

FIG. 16 illustrates the fact that a screen used to generate the new feature also enjoy the same benefit of the new feature;

FIG. 17 further illustrates a code-generating robot that has just generated itself with a new feature that is now also available for other applications.

DETAILED DESCRIPTION

Figure 1:
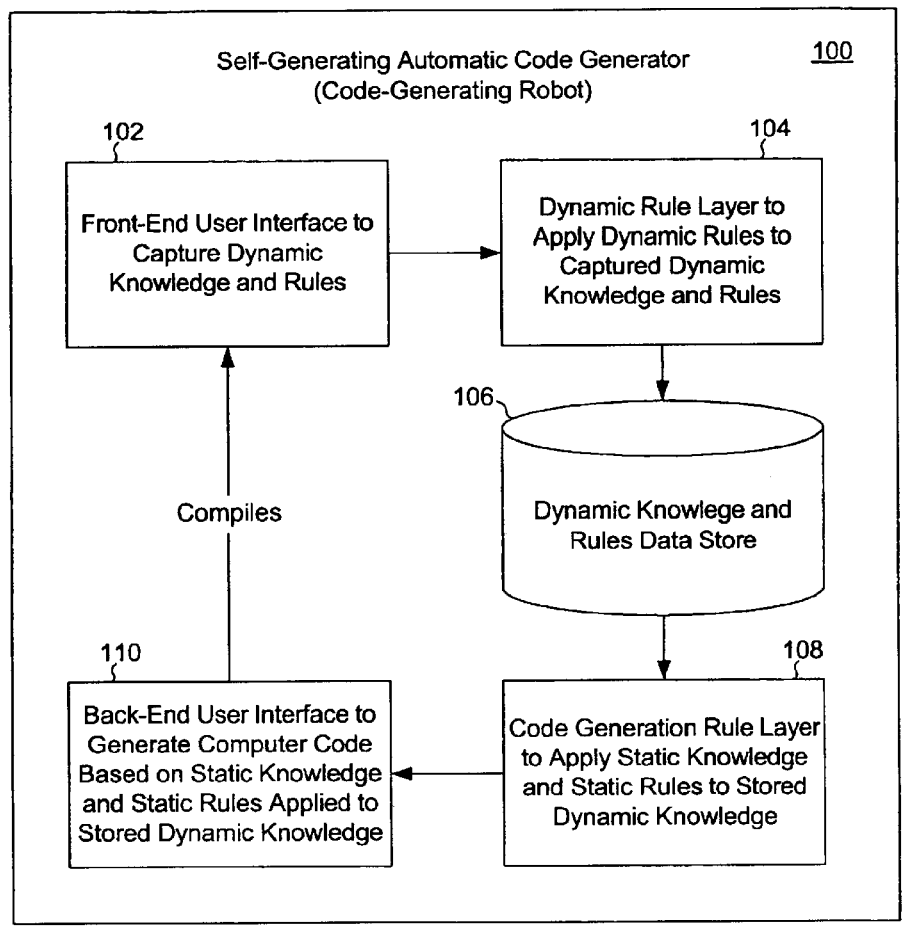
FIG. 1 is a block diagram of a self-generating automatic code generator, also referred to herein as a code-generating robot.

The present invention solves the foregoing problems and disadvantages by providing a self-generating automatic code generator that maintains continuity with the enterprise applications it creates throughout development and maintenance of the applications. If a new feature is required by one application that would also by needed by the other applications within the organization, a programmer may simply add this new feature to the self-generating automatic code generator, which is itself an enterprise application, after which the self-generating automatic code generator can, within seconds, regenerate the other applications to include this new feature, including itself.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

FIG. 1 is a block diagram of a self-generating automatic code generator 100 (also referred to herein as a "code-generating robot" or simply "robot") according to an embodiment of the invention. A typical enterprise application essentially includes input, data stores and output. Input data is usually captured by a screen (user interface) or by integration with other applications. In order to make sure that the input data are stored properly, a set of rules must be defined and applied to the input data. The output data is usually a report, a document, a file, or integration with other applications. There is usually a criteria screen for the selection of the output data. A set of rules is also defined and applied to the output data to make them useful.

As shown in FIG. 1, the code-generating robot 100 is, itself, an enterprise application. In one embodiment, the code-generating robot 100 includes a front-end user interface 102 for software developers to capture dynamic knowledge and dynamic rules as input required for automatic code generation. The code-generating robot 100 also includes a dynamic rule layer 104 to apply dynamic rules to captured dynamic knowledge and rules.

As illustrated, the front-end user interface 102, as well as various other screens depicted in succeeding figures, may be displayed within the context of a standard web browser, such as Microsoft Internet Explorer™. However, those of skill in the art will recognize that the present invention is not limited to web-based implementations.

In the depicted embodiment, the code-generating robot 100 includes one or more data stores 106, such as a SQL (structured query language) server, for storing and organizing the dynamic knowledge and dynamic rules captured by the front-end user interface 102. In one embodiment, the SQL server may be embodied as a standard Microsoft SQL Server or other SQL server known to those of skill in the art.

As further illustrated in FIG. 1, the code-generating robot 100 also includes a code generation rule layer 108 to apply static knowledge and static rules to stored dynamic knowledge. Finally, the robot 100 includes, in one configuration, a back-end user interface 110 to generate computer code based on static knowledge and static rules applied to stored dynamic knowledge.

Figure 2:
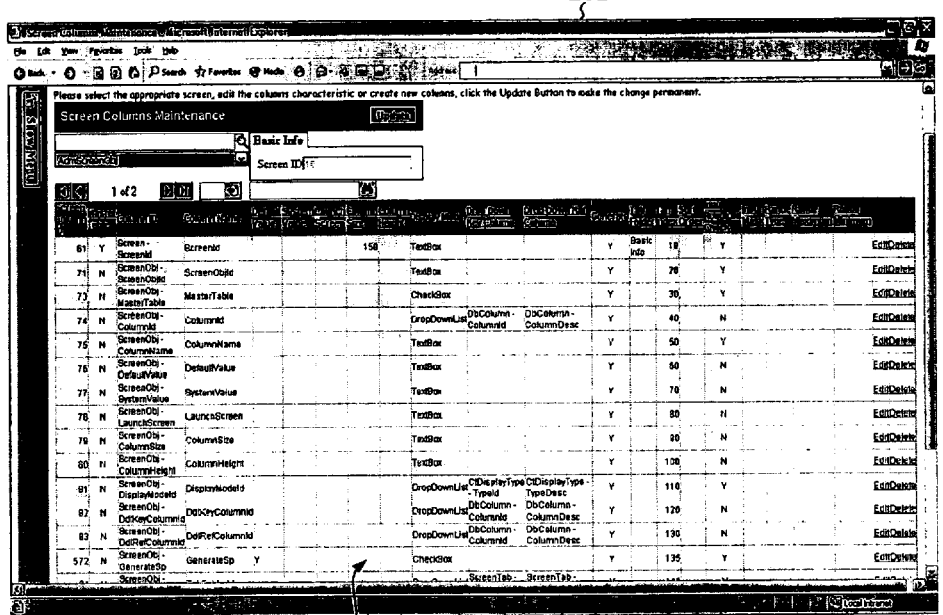
FIG. 2 is a user interface screen for capturing some of the dynamic knowledge required for generating itself or a different screen.

Each enterprise application has its purpose. The purpose of the code-generating robot 100 is to generate an enterprise application such as itself. Therefore, as shown in FIG. 2, the input data is the dynamic knowledge 200 required by the target enterprise application. As an example, for a code-generating robot 100 to generate a screen 202 for a target enterprise application, including itself, the dynamic knowledge 200 captured may include:

Screen name;

Table names to store the input data;

Column names and their structures to store the input data;

The absolute or relative positions these columns should appear on the screen;

The manner these columns should appear on the screen; etc.

Figure 3:
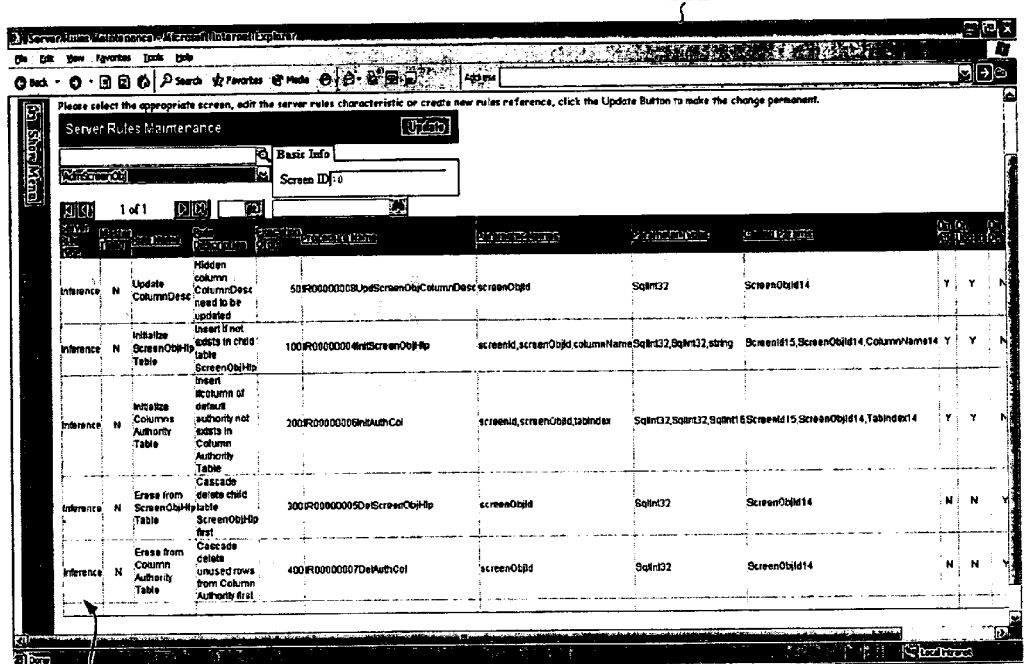
FIG. 3 is a user interface screen for capturing some of the dynamic rules required for the validation and organization of dynamic knowledge captured by the user interface screen of FIG. 2.

Referring to FIG. 3, depending on the dynamic knowledge 200 captured, certain dynamic rules 300 are provided to ensure that the dynamic knowledge 200 captured is useful data and structured in a desirable manner. Various types of dynamic rules 300 may be captured. For instance, the dynamic rules 300 may include:

Validation rules governing input data integrity, e.g., constraint rules. An example of a validation rule may include "execution order entered must be positive".

Calculation rules performing mathematical computation to input data, e.g., computation rules. An example of a calculation rule may include "total invoice amount= sales amount+sales tax".

Inferring rules modify or add other data based on input data, e.g., inference rules. An example of an inferring rule may include "if new column entered then default new column to read only".

Action rules triggers other activities based on input data, e.g., action-enabling rules. An example of an action rule may be to delete all the storage of help message, heading, label, etc. associated with a column if that column is being erased from the screen to be generated.

FIG. 3. provides an example screen 302 showing different dynamic rules 300. However, those of skill in the art will recognize that a wide variety of other rules 300 may be provided within the scope of the invention.

Because the code-generating robot 100 is to generate an enterprise application such as itself, several conditions should be satisfied, although not all of the following conditions may be satisfied in every embodiment. First, the application and the code-generating robot 100 employ substantially identical (i.e., similar, compatible, interoperable) user interfaces to capture knowledge and rules. For instance, Screen Columns Maintenance screen FIG. 200 that capture dynamic knowledge for screen columns has essentially the same user interfaces as the Server Rules Maintenance screen FIG. 300 that capture dynamic knowledge for screen business rules.

Second, the knowledge and rules captured by both the application and the code-generating robot are of substantially identical types. As an example, screen column name is stored as Unicode characters.

Third, the application and the code-generating robot 100 employ substantially identical platforms, languages, and architectures. For example, in the depicted embodiment, the application and the code-generating robot 100 may each use Windows Server 2003 as the platform, C# as the computer language, and Microsoft Dot Net Framework as the architecture.

Finally, the application and the code generators employ substantially identical data stores and data relationships. For example, SQL relational databases could be used within an embodiment of the invention.

Figure 4:
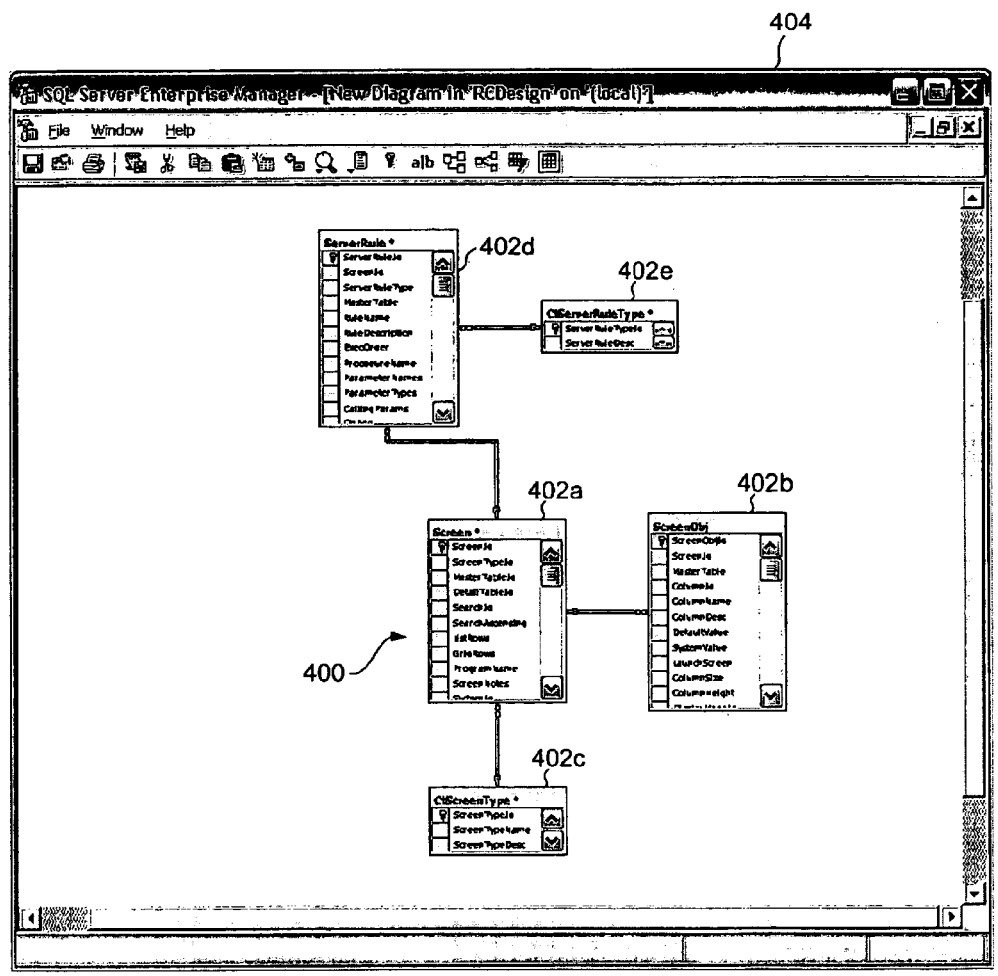
FIG. 4 is an entity relationship diagram showing some of the data stored and their relationships for the dynamic knowledge captured in FIG. 2.

Referring to FIG. 4, the captured dynamic knowledge 200 and rules 300 are then stored as relational data 400 in an SQL Server (not shown). As illustrated, the relational data 400 may include various tables 402, such as a screen table 402*a*, a screen object table 402*b*, a screen type table 402*c*, a server rule table 402*d*, and a server rule type table 402*e*.

In one embodiment, the screen table 402*a* is used for capturing characteristic of a screen. It may include various columns, such as Screen Type, Table Name, Program Name, etc.

The screen object table 402*b* is used for capturing columns characteristic of a screen. Columns for the screen object table 402*b* may include Column Name, Column Type, Column Size, etc.

The screen type table 402*c* may be used to capture name and description of each screen type. Columns for the screen type table 402*c* may include Screen Type Name, Screen Type Description, etc.

In the illustrated embodiment, the server rule table 402*d* may be used to capture server side business rules. Columns within the server rule table 402*d* may include Rule Name, Rule Type, Execution Order, etc.

Finally, the server rule type table 402 may be used to capture name and description each server rule type. Columns within the server rule type table 402 may include Server Rule Type Name, Server Rule type Description.

In the depicted embodiment of FIG. 4, the relational data 400 is being displayed by a SQL Server Manager, utility 404, which is typically included with a standard SQL server. Such utilities 404 may be used in the process enterprise software development, but are not necessary for the operation of the code-generating robot 100.

Referring to FIG. 5, various static universal knowledge and rules 500 may be applicable to all (or a majority of) applications. The knowledge is generally framework- or platform-related, such as network connectivity, database connectivity, security, language, architecture, etc. For example, in the illustrated embodiment, the static universal knowledge and rules 500 relate to preparing codes based on various data types specific to the database used.

The static universal knowledge and rules 500 are depicted within a SQL query analyzer 502, which, again, is a utility provided with a standard SQL server that may assist with enterprise software development, but is not required for the operation of the code-generating robot 100.

The static universal knowledge and rules 500 usually comprise the code to be generated depending on the dynamic knowledge 200 being captured. As explained with reference to FIG. 1, the code generation rule layer 108 applies the static knowledge and rules 500 to the captured dynamic knowledge 200 and rules 300 that are stored within the data store 106.

Figure 6:
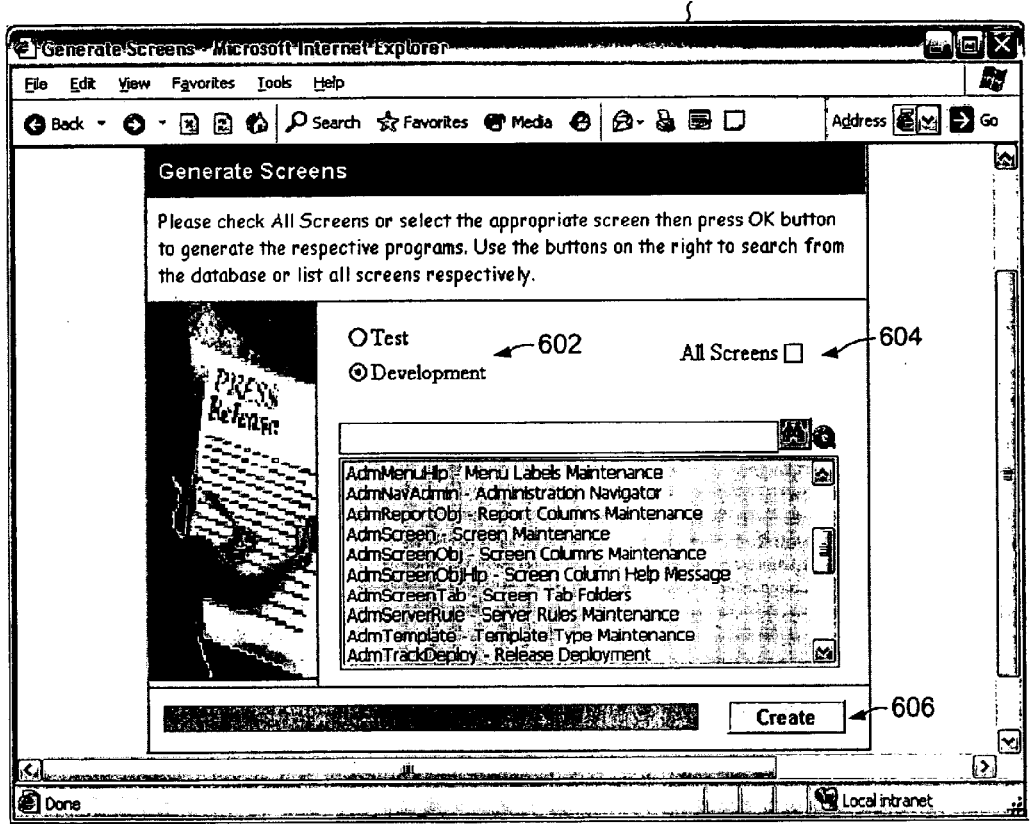
FIG. 6 is a user interface for the generation of computer codes based on static knowledge and static rules applied to captured dynamic knowledge.

As shown in FIG. 6, when a user is ready to generate the computer code required for the target application, including the code-generating robot 100 itself, the back-end user interface 110 for code generation is called upon. The back-end user interface 110 displays a list of screens from which the user may select the screen (or screens) to be generated.

In one embodiment, a selection mechanism 602 is provided to allow the user to decide whether the code is to be generated in the target language and platform on a test basis for further checking or directly deployed to the development environment. When a user selects the "test" option, the system proceeds to generate codes to a predefined directory for reviewing and testing only. If, however, the user selects the "deployment" option, the system proceeds to generate codes to a predefined development directory for compilation.

In one embodiment, the back-end user interface 110 includes an "all screens" check box 604 that allows the user to automatically select all of the listed screens for generation. The generation process starts in response to the user selecting a "create" button 606 or the like.

The computer code generated is not limited to a particular user interface, network interface, security, connectivity, integration, database schema, etc. The computer code generated is also not limited to any computer language, architecture, or platform.

Figure 7:
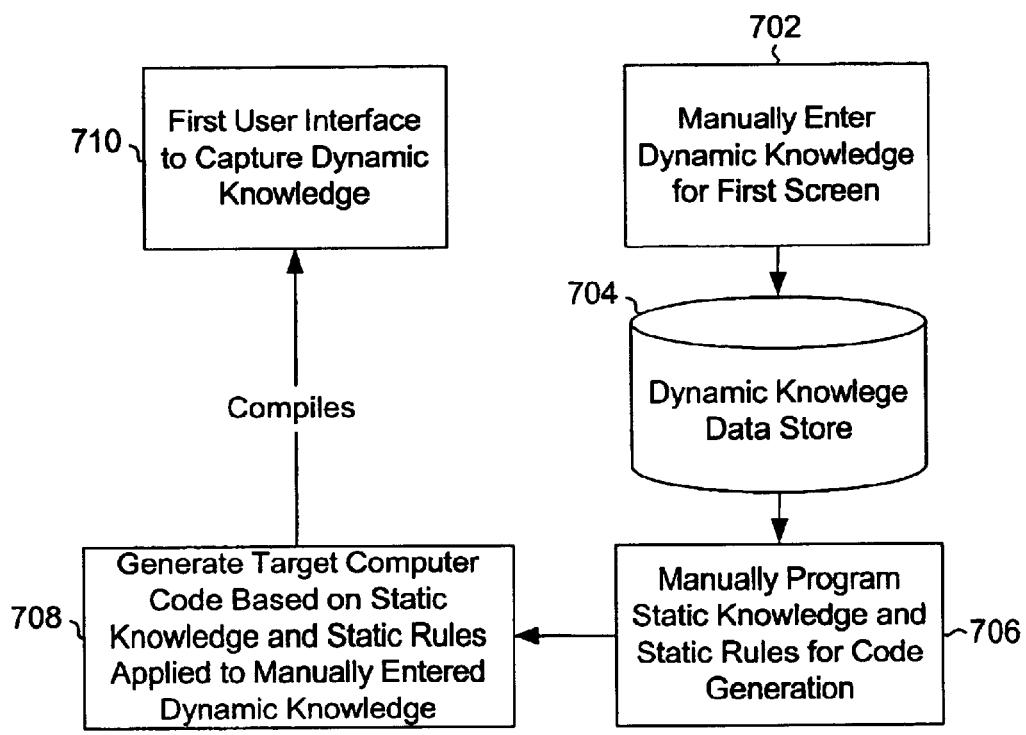
FIG. 7 illustrates a process of seeding a first iteration of the code-generating robot.

FIG. 7 is flowchart of a process for creating a code-generating robot 100 according to an embodiment of the invention. Those of skill in the art will recognize that the code-generating robot 100 cannot generate itself when it does not initially exist. Accordingly, the process begins with seeding. The first utility that needs to be generated is the screen for capturing dynamic knowledge, as depicted in FIG. 2. Therefore, to seed the code-generating robot 100, the dynamic knowledge that should have been captured by this interface (that does not yet exist) is manually entered 702 and stored in a dynamic knowledge data store 704.

The dynamic knowledge is manually entered with extreme care so that the dynamic rules required for this screen can be deferred. Thereafter, the static knowledge and static rules are manually programmed 706 to apply to the manually entered dynamic knowledge. Using these knowledge and rules, the code generator generates 708 (compiles the knowledge and rules into) the very first screen 710.

Figure 8:
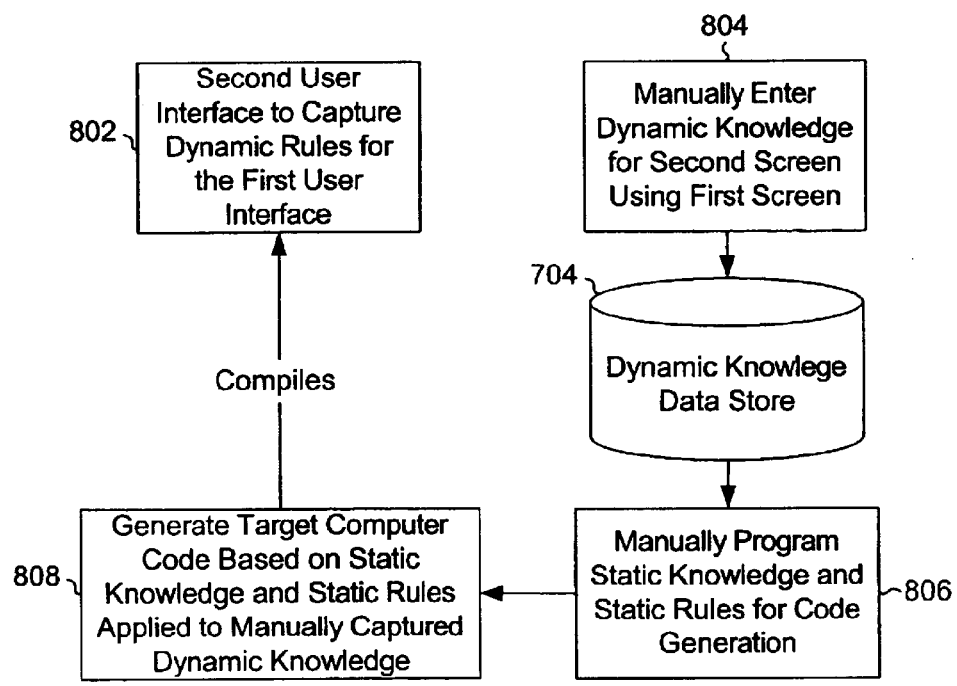
FIG. 8 illustrates a process of enhancing the first iteration of the code-generating robot.

This first screen 710 does not yet have any dynamic rules attached, and many other features may still be needed for this screen. Therefore, as shown in FIG. 8, a second screen 802—the user interface needed to capture dynamic rules—is created by using the first screen 710 to capture the dynamic knowledge required for the second screen. This is done carefully, since no dynamic rules are available yet for the first screen 710.

As before, the dynamic knowledge is stored within the dynamic knowledge store 704. Thereafter, the static knowledge and static rules are manually programmed 806 to apply to the manually entered dynamic knowledge. Using these knowledge and rules, the code generator then generates 808 target computer codes for the second screen 802. When the second screen 802 (an example of which is shown in FIG. 3) is available, it is used to capture the dynamic rules required for the first screen 710, and thus, the first screen 710 is enhanced.

By the iterative process of developing more and more utilities as in FIG. 8, more and more new features can be added to the code-generating robot 100. Because the same features are available for the target applications the robot 100 generates, the reverse is also true when a new feature is required by a target application. The new feature is added to this self-generating automatic code generator 100 first. The code for the target application is then generated with the new feature in it.

An example of the foregoing process is now described with reference to FIGS. 9–17. Suppose that a user wishes to add a new feature, such as a filter, to a screen. The purpose of this screen filter is to allow a user to choose from a list of radio-buttons to selectively display certain items from a list of items, e.g., active vs. inactive employees in a payroll system. As illustrated in FIG. 9, selecting the first radio button 902 displays a list of all the active employees, while, as shown in FIG. 10, selecting the second radio-button 1002 displays only the inactive employees.

Figure 11:
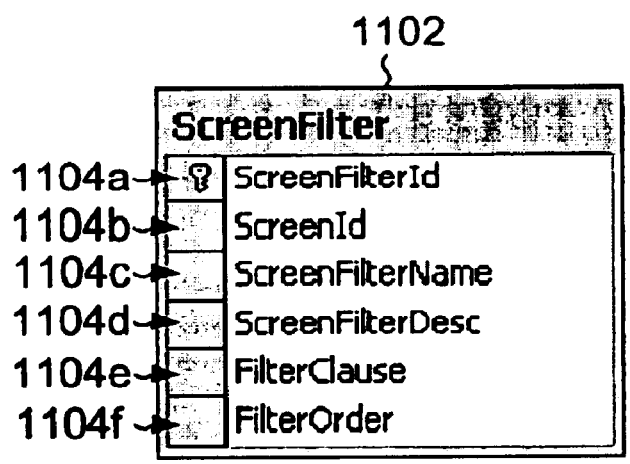
FIG. 11 is a table with columns used for the storage of dynamic knowledge for the new feature "Screen Filters" to appear in the desired applications.

Referring to FIG. 11, to enable this feature for one or more target applications, such as the one depicted in FIGS. 9 and 10, as well as for the code-generating robot 100 itself, a data store table 1102 called "ScreenFilter" is first created. The table 1102 may include various columns 1104, such as screen filter ID 1104a, screen ID 1104b, screen filter name 1104c, screen filter description 1004d, filter clause 1104e, and filter order 1104f.

The screen filter ID 1104a may be used for identifying this particular screen filter in the system. The screen ID 1104b relates to the particular screen this screen filter applies to. The screen filter name 1104c is the unique name identifying this screen filter. The screen filter description 1104d may contain description other than just a name to easily identify this screen filter upon sorting or searching. The filter clause 1104e relates to the condition this screen filter becomes valid. Finally, the filter order 1104f defines the order this screen filter appears with respect to other filters for the same screen. Of course, the table 1102 may include additional or different information within the scope of the invention.

Thereafter, as depicted in FIG. 12, the dynamic knowledge needed for the screen "ScreenFilter" is captured using the first screen created by the code-generating robot 100. The dynamic knowledge may be represented within one or more columns 1202. For example, the columns 1202 may include screen column ID 1202a, master table 1202b, column ID 1202c, column name 1202d, default value 1202e, system value 1202f, launch screen 1202g, column size 1202h, column height 1202i, and display mode 1202j, drop down key column 1202k.

The screen column ID 1202c relates to the column of the data store for this column. The column name 1202d is the unique name referring to the column of the data store for this column. The default value 1202e capture the initial displayed value for this column. The system value 1202f capture the server assigned value for this column, etc. Different or additional columns 1202 may be provided within the scope of the invention.

Figure 13:
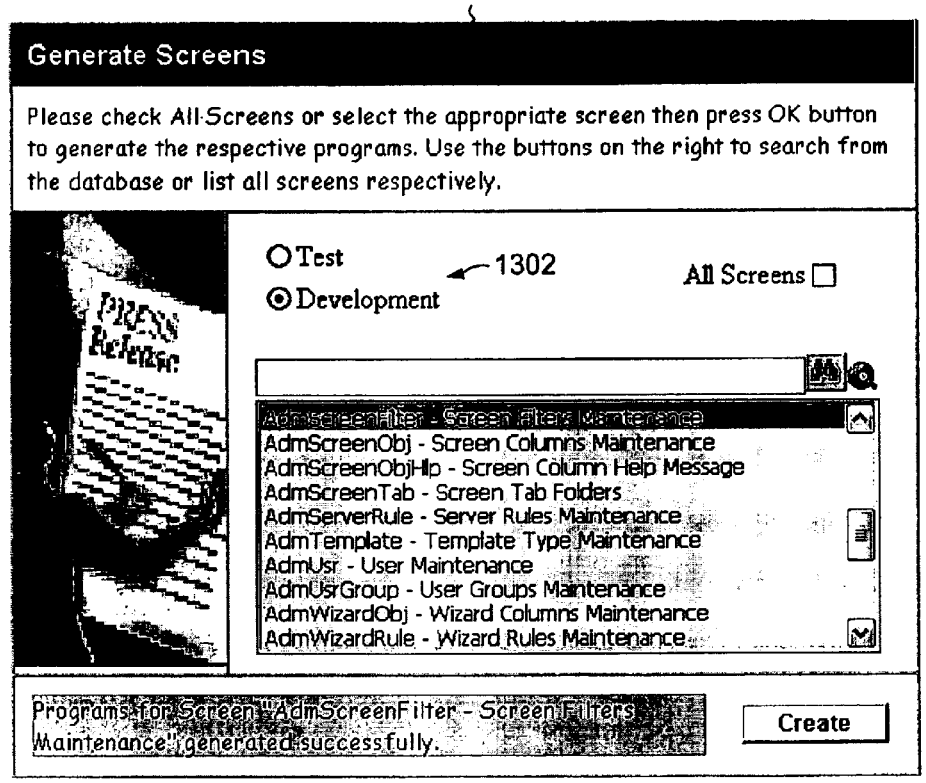
FIG. 13 is a dialog for generating the screen required to capture dynamic knowledge for the new feature "Screen Filters"

As shown in FIG. 13, the code for the "ScreenFilter" screen may be generated using the depicted code-generation screen 1300. As previously noted, the code-generation screen 1300 may include a selection mechanism 1302 for allowing the user to determine whether the code is to be generated in the target language and platform on a test basis for further checking or directly deployed to the development environment.

Referring to FIG. 14, note that the new feature "Screen Filter" is not available for the newly generated screen which is used to capture dynamic knowledge for screen filters. As depicted in FIG. 14, this screen is now available to capture dynamic knowledge for all screen filters for selected screens. The "salary" screen is used as an example to demonstrate the knowledge captured. Note that there is no screen filter yet for this screen.

FIG. 15 illustrates the addition of the static knowledge and rules 1500 needed for the generation of codes for this new feature. In the illustrated embodiment, the static knowledge and rules is represented as program code in the C# language. However, any language could be used within the scope of the invention.

Referring to FIG. 16, the next step is to generate and test the codes using salary info screen (see FIGS. 9 & 10) as an example. When satisfied, a Screen Filter Maintenance screen 1600 is used to capture dynamic knowledge for itself. The dynamic knowledge captured for itself includes the screen that refers to itself, the condition that this screen filter becomes valid, and the order this screen filter appears with respect to other screen filters for the same screen.

As shown in FIG. 17, this new filter feature is now apparent as more dynamic knowledge is captured for this Screen Filter Maintenance screen 1700 itself, which is being used to generate other applications. This new feature is fully utilized now in the code-generating robot generator 100. Notice not only the screen (FIG. 17) for the self-generated code generator 100 has the same features as the screen (FIGS. 9 & 10) for the application it generates, they share the same look and feel, architecture, language, platform, etc.

Figure 18:
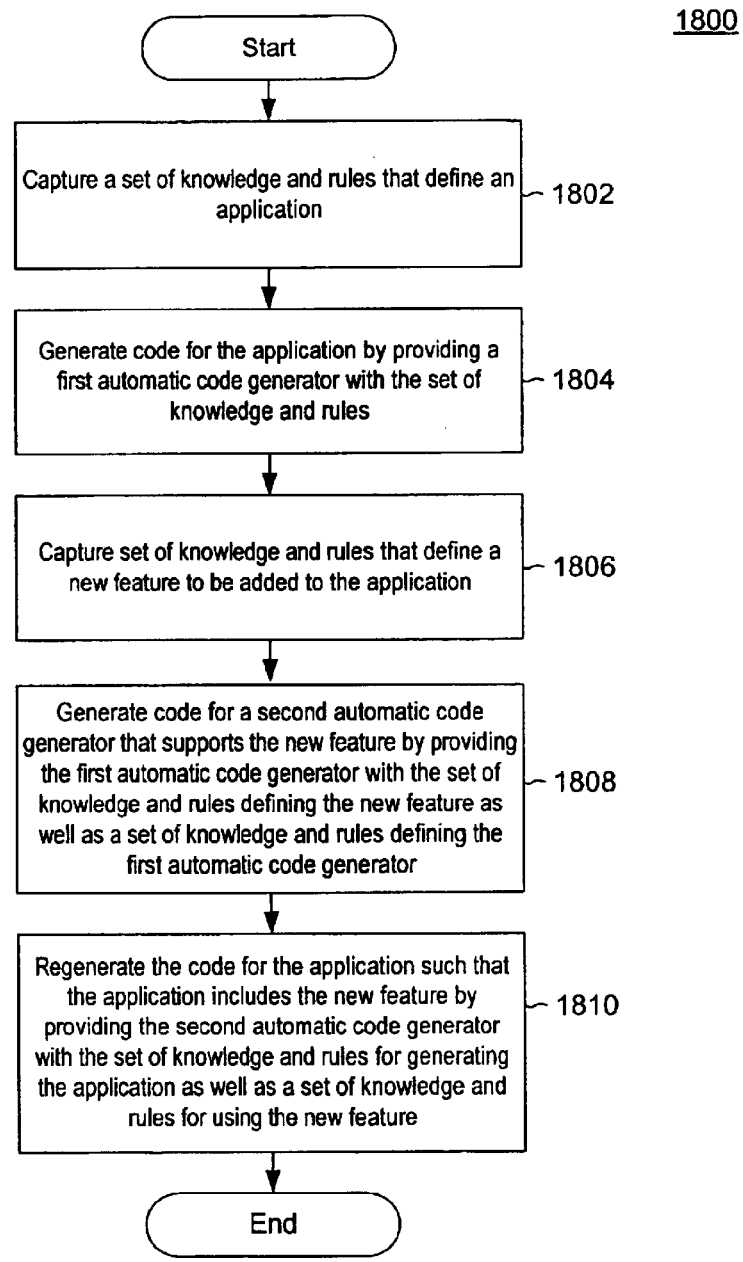
FIG. 18 is a flowchart of a method for application development and maintenance according to an embodiment of the invention.

FIG. 18 is a flowchart for a method 1800 for adding a new feature to an application generated by an automatic code generator. Initially, a set of knowledge and rules that define an application is captured 1802. Thereafter, code for the application is generated 1804 by providing a first automatic code generator, such as the code-generating robot 100 of FIG. 1, with the set of knowledge and rules.

A set of knowledge and rules that define a new feature to be added to the application is then captured 1806. In one embodiment, code for a second automatic code generator (e.g., a new version of the first automatic code generator) that supports the new feature is then generated 1808 by providing the first automatic code generator with the set of knowledge and rules defining the new feature as well as a set of knowledge and rules defining the first automatic code generator.

Finally, code for the application is regenerated 1810 such that the application includes the new feature by providing the second automatic code generator with the set of knowledge and rules for generating the application as well as a set of knowledge and rules for using the new feature.

While specific embodiments and applications of the present invention have been illustrated and described, it is to be understood that the invention is not limited to the precise configuration and components disclosed herein. Various modifications, changes, and variations apparent to those of skill in the art may be made in the arrangement, operation, and details of the methods and systems of the present invention disclosed herein without departing from the spirit and scope of the present invention.

What is claimed is:

1. A computer-implemented method for adding a new feature to an application generated by an automatic code generator comprising:

capturing a set of knowledge and rules that define the application;

generating codes for the application by providing a first automatic code generator with the set of knowledge and rules;

capturing a set of knowledge and rules that define a new feature to be added to the application;

generating codes for a second automatic code generator that supports the new feature by providing the first automatic code generator with the set of knowledge and rules defining the new feature as well as a set of knowledge and rules defining the first automatic code generator; and regenerating the code for the application such that the application includes the new feature by providing the second automatic code generator with the set of knowledge and rules for generating the application as well as a set of knowledge and rules for using the new feature.

2. The method of claim 1, wherein the application and the code generators employ substantially identical user interfaces to capture knowledge and rules.

3. The method of claim 2, wherein the knowledge and rules captured by both the application and the code generator are of substantially identical types.

4. The method of claim 1, wherein the application and the code generators employ substantially identical platforms, languages, and architectures.

5. The method of claim 1, wherein the application and the code generators employ substantially identical data stores and data relationships.

6. The method of claim 1, wherein the application and the code generators employ substantially identical user interfaces, platforms, languages, and architectures, data stores, and data relationships.

7. The method of claim 1, wherein the first code generator is a subsequent iteration of an earlier code generator automatically generated by the earlier code generator.

8. The method of claim 1, further comprising:
regenerating codes for a second application such that the second application includes the new feature by providing the second automatic code generator with a set of knowledge and rules for generating the second application as well as a set of knowledge and rules for using the new feature.

9. The method of claim 1, wherein the rules comprise at least one of:
validation rules governing input data;
calculation rules for performing mathematical calculations on input data;
inference rules for modifying or adding other data based on input data; and
action rules for triggering actions based on input data.

10. The method of claim 1, further comprising storing captured rules and knowledge within a relational database.

11. A self-generating automatic code generation system comprising:
a user interface for capturing a set of knowledge and rules that define an application;
a first automatic code generator for generating codes for the application using the set of knowledge and rules;
a user-interface for capturing a set of knowledge and rules that define a new feature to be added to the application; and
a second automatic code generator that was automatically generated by the first automatic code generator using the set of knowledge and rules defining the new feature as well as a set of knowledge and rules defining the first automatic code generator,
wherein the second automatic code generator is to regenerate the code for the application such that the application includes the new feature using the set of knowledge and rules for generating the application as well as a set of knowledge and rules for using the new feature.

12. The system of claim 11, wherein the application and the code generators employ substantially identical user interfaces to capture knowledge and rules.

13. The system of claim 12, wherein the knowledge and rules captured by both the application and the code generator are of substantially identical types.

14. The system of claim 11, wherein the application and the code generators employ substantially identical platforms, languages, and architectures.

15. The system of claim 11, wherein the application and the code generators employ substantially identical data stores and data relationships.

16. The system of claim 11, wherein the application and the code generators employ substantially identical user interfaces, platforms, languages, and architectures, data stores, and data relationships.

17. The system of claim 11, wherein the first code generator is a subsequent iteration of an earlier code generator automatically generated by the earlier code generator.

18. The system of claim 11, wherein the second code generator is to regenerate code for a second application such that the second application includes the new feature using a set of knowledge and rules for generating the second application as well as a set of knowledge and rules for using the new feature.

19. The system of claim 11, wherein the rules comprise at least one of:
validation rules governing input data;
calculation rules for performing mathematical calculations on input data;
inference rules for modifying or adding other data based on input data; and
action rules for triggering actions based on input data.

20. The system of claim 11, further comprising a relational database for storing captured rules and knowledge.

21. A computer program product comprising program code for performing a method for adding a new feature to an application generated by an automatic code generator comprising:
program code for capturing a set of knowledge and rules that define the application;
program code for generating codes for the application by providing a first automatic code generator with the set of knowledge and rules;
program code for capturing a set of knowledge and rules that define a new feature to be added to the application;
program code for generating codes for a second automatic code generator that supports the new feature by providing the first automatic code generator with the set of knowledge and rules defining the new feature as well as a set of knowledge and rules defining the first automatic code generator; and
program code for regenerating the code for the application such that the application includes the new feature by providing the second automatic code generator with the set of knowledge and rules for generating the application as well as a set of knowledge and rules for using the new feature.

22. The computer program product of claim 21, wherein the application and the code generators employ substantially identical user interfaces to capture knowledge and rules.

23. The computer program product of claim 22, wherein the knowledge and rules captured by both the application and the code generator are of substantially identical types.

24. The computer program product of claim 21, wherein the application and the code generators employ substantially identical platforms, languages, and architectures.

25. The computer program product of claim 21, wherein the application and the code generators employ substantially identical data stores and data relationships.

26. The computer program product of claim 21, wherein the application and the code generators employ substantially identical user interfaces, platforms, languages, and architectures, data stores, and data relationships.

27. The computer program product of claim 21, wherein the first code generator is a subsequent iteration of an earlier code generator automatically generated by the earlier code generator.

28. The computer program product of claim 21, further comprising:
program code for regenerating codes for a second application such that the second application includes the new feature by providing the second automatic code generator with a set of knowledge and rules for generating the second application as well as a set of knowledge and rules for using the new feature.

29. The computer program product of claim 21, wherein the rules comprise at least one of:

validation rules governing input data;

calculation rules for performing mathematical calculations on input data;

inference rules for modifying or adding other data based on input data; and action rules for triggering actions based on input data.

30. The computer program product of claim 21, further comprising program code for storing captured rules and knowledge within a relational database.

31. A self-generating automatic code generator comprising:

a front-end user interface to capture dynamic knowledge and rules;

a dynamic rule layer to apply the dynamic rules to the dynamic knowledge and rules;

a data store for storing the dynamic knowledge and rules after application of the dynamic rules by the dynamic rule layer;

a code generation rule layer to apply static knowledge and rules to the stored dynamic knowledge; and a back-end user interface to generate new computer code for the front-end user interface based on the static knowledge and static rules applied to the stored dynamic knowledge.

32. A method for creating a self-generating automatic code generator comprising:

manually programming dynamic knowledge for a user first interface for capturing dynamic knowledge;

manually programming static knowledge and rules to be applied to the manually-programmed dynamic knowledge;

generating codes for the first user interface using the manually-programmed static knowledge and static rules applied to the manually-programmed dynamic knowledge;

using the first user interface to capture dynamic knowledge for a second user interface for capturing dynamic rules;

manually programming static knowledge and rules to be applied to the manually-programmed dynamic knowledge for the second user interface;

generating codes for the second user interface using the manually-programmed static knowledge and static rules for the second user interface applied to the manually-programmed dynamic knowledge for the second user interface;

using the first and second user interfaces to capture dynamic knowledge and rules, respectively, for a third user interface for the automatic code generator; and automatically generating codes for the automatic code generator using the captured dynamic knowledge and rules.

* * * * *